(Model.)  2 Sheets—Sheet 1.

C. O. GARDINER.
Cultivator.

No. 237,739.  Patented Feb. 15, 1881.

Attest.  
Sidney P. Hollingsworth  
Nathan C. Lane

Inventor.  
C. O. Gardiner,  
By Dodge Son  
Attys (Model.)
2 Sheets—Sheet 2.
C. O. GARDINER.
Cultivator.
No. 237,739.  Patented Feb. 15, 1881.
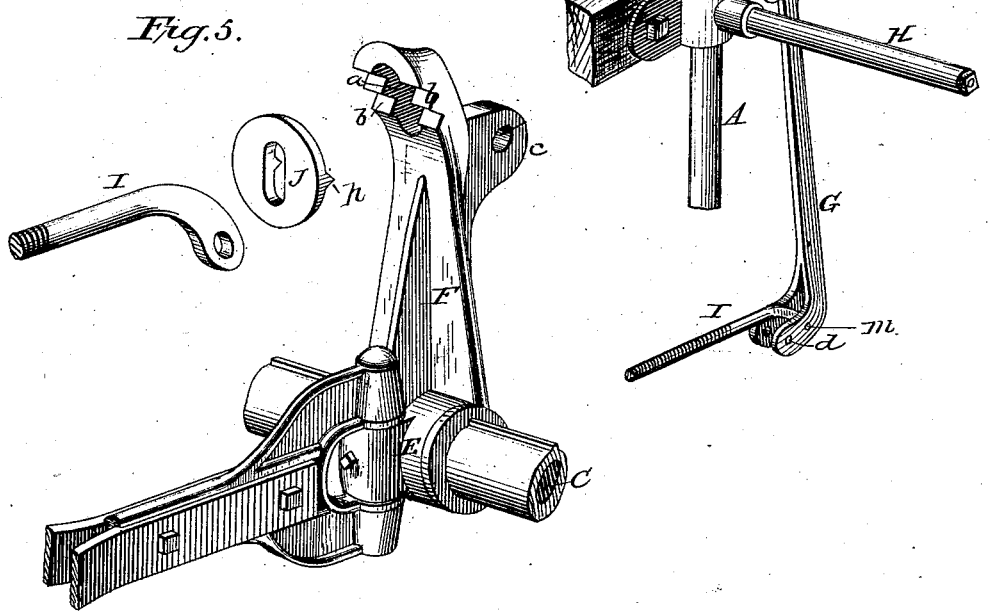

UNITED STATES PATENT OFFICE.

CHARLES O. GARDINER, OF SPRINGFIELD, OHIO, ASSIGNOR TO P. P. MAST & CO., OF SAME PLACE.

CULTIVATOR.

SPECIFICATION forming part of Letters Patent No. 237,739, dated February 15, 1881.

Application filed July 7, 1880. (Model.)

*To all whom it may concern:*

Be it known that I, C. O. GARDINER, of Springfield, in the county of Clarke and State of Ohio, have invented certain Improvements in Cultivators and Similar Implements, of which the following is a specification.

This invention relates to that class of wheeled implements having vertically-swinging beams or drag-bars, in which springs are applied to raise or assist the attendant in raising the beams.

The invention consists in an improved manner of applying the springs, whereby their action is rendered more efficient and their ready adjustment provided for.

In carrying my improvement into practice I provide the forward end of the beam, or the coupling by which the beam is connected to the draft-frame, or the axle, in case the latter is free to rotate, with an upright arm, the forward movement of which will cause the beam to swing upward. To this arm, near but below its upper end, I pivot the lower end of an upright lever, the upper end of which bears against an arm or roller which is extended outward from the side of the frame or the arch at the top of the machine. A rod is pivoted to the lever above its point of union with the arm and passed backward through the arm, and provided with a spiral spring which tends to push the arm forward and thereby elevate the beam. The spring bears at its rear end against an adjustable plate or collar on the rod, and at the front end against a plate or collar which has a knife-edge bearing upon the arm. The arm is provided with two or more seats for this bearing at different distances from the fulcrum of the lever, so that the spring may be adjusted to act with more or less power upon the beam, as desired. The upper end of the lever is provided with a shoulder or incline, which rides beneath the fixed roller or arm when the beam is elevated so as to prevent the same from falling.

Figure 1:
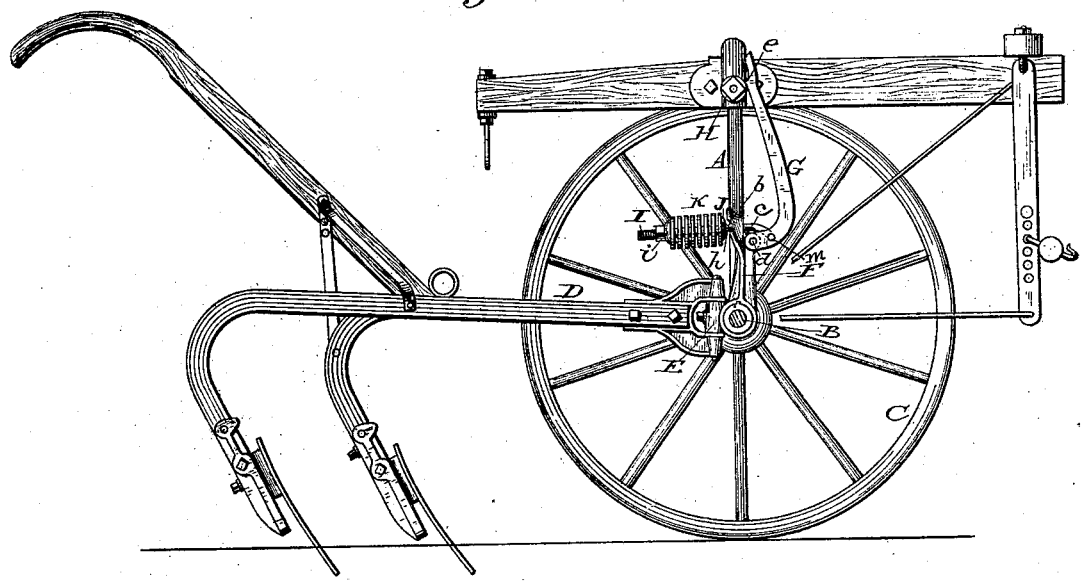
Figure 2:
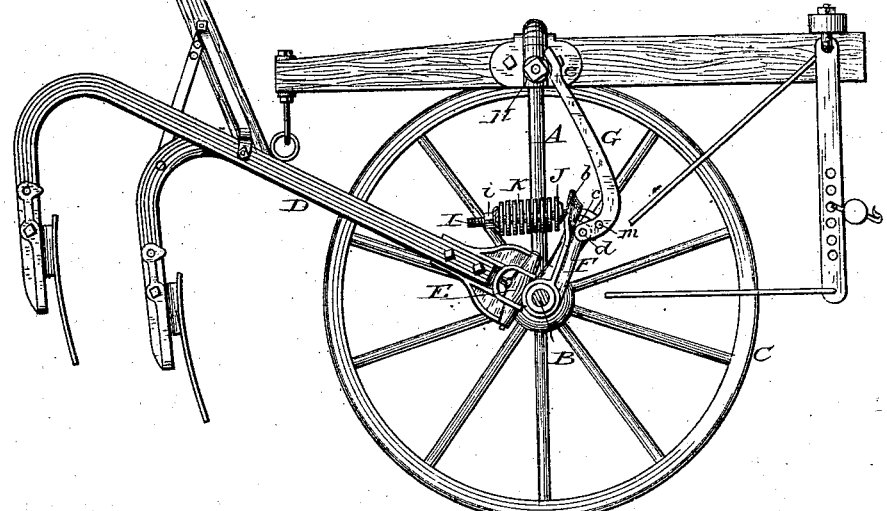

Figure 1 is a side elevation of a machine provided with my improvement, the beams being shown in an operative position. Fig. 2 is a like view of the machine with the beams elevated; Fig. 3, a perspective view, showing the operating-arm attached to the axle; Fig. 4, a perspective view, showing the roller or bearing arm on the side of the frame, the lever bearing thereon and the rod to receive the spring; Fig. 5, a perspective view, showing the forward end of the beam, the coupling with the arm thereon, and the rod and bearing-plate for the spring.

Aside from the features comprised in my invention, the machine may be of any ordinary or suitable construction, the drawings representing a form of machine now in general use.

The machine consists, mainly, of an arched frame, A, provided at the lower ends with outwardly-extending axles B, carried in ground wheels C. A tongue or draft-pole is attached to the top of the frame, and a beam or drag-bar, D, attached to each axle by means of a coupling, E. Each beam is connected to its coupling by a vertical pin, in order that it may swing laterally, and each coupling is free to turn around or with the axle, in order that the beams may swing vertically. The above-named parts are all constructed and arranged in the ordinary manner.

Ordinarily the coupling E is free to revolve upon its axle, and when this is the case I secure to or form upon the coupling an upright arm, F, such as represented in Figs. 1, 2, and 5, having its upper end provided with a slot, $a$, a series of transverse grooves or notches, $b$, on the rear face at the sides of the slot, and a perforated lug, $c$, on the front side.

To the lug $c$, I connect, by a pivot pin or bolt, $d$, a lever, G, which extends forward and upward, as shown in Figs. 1, 2, and 4, and which has at the upper end a shoulder or incline, $e$, on the rear side.

From the side of the frame A, near its top, and directly over the axle, I extend a horizontal arm or a roller, H, to form a bearing for the rear side of the lever G, which is caused to ride up and down thereon as the arm F is moved in raising and lowering the beams.

To the lever G, at the point $m$, just above the point at which it is pivoted to arm F, I pivot a rod, I, which is curved slightly upward and extended backward through the slot in the arm, and provided at its rear end with a screw-thread, as shown.

Upon the rod I, from the rear end, I apply a plate or collar, J, the front side of which is provided with a sharp rib or knife-edge, $h$, to bear in the seats $b$ in arm F. Behind this plate I place upon the rod a strong spiral spring, K, and behind the spring place a bearing plate or washer and a nut, $i$, to hold and adjust the same. The spring and rod, arranged as shown, tend to throw the arm F and lever G out of line with each other. As the lever has a solid bearing against the arm or roller H the spring urges the upper end of the arm forward toward the lever, and thus tends to raise the beam and lift the shovels from the ground.

By changing the bearing-edge $h$ from one to another of the seats in the arm, and adjusting the nut $i$ to vary the tension of the spring, the lifting strain upon the beam may be increased or diminished, so that the spring will lift the whole or any desired portion of the weight of the beam. As the beam descends toward its operative position the bearings or pivotal points $d$ and $m$ and the spring approach a common line, so that the lifting effect of the spring is decreased, and it is prevented from raising the beams and shovels when the machine is in action.

Ordinarily it is best to arrange the parts so that a slight lifting action will be exerted on the beam when in action; but the parts may be adjusted so that the bearing-points will stand in line and entirely neutralize the action of the spring when the beam is in action; or the adjustment may be such that as the beam falls to an operative position the pivot $d$ will pass the center, or, in other words, rise above the line of the spring and the bearing $m$, in which event the spring will automatically change from its lifting action and tend to hold the beam down as long as the latter remains in an operative position.

The changing of the bearing $m$ from one to another of the seats in the arm serves not only to change the leverage, but also, in a measure, to determine and change the positions in which the beam stands when in action and out of action. When the beam is raised out of action the shoulder $e$ of the lever rides beneath the roller or arm H and offers an increased resistance to prevent the descent of the beams.

When the coupling is mounted loosely upon the axle, as above described, it is made adjustable laterally thereon to change the distance between the beams. This adjustment, of course, moves the arm and lever to correspond, but as the roller H is made of proper length the lever can move freely thereon without disengaging or changing its action.

In some cases the coupling is connected to the axle or a sleeve thereon by a longitudinal spline or feather, and the axle or sleeve arranged to revolve. When the parts are thus arranged the arm F may be attached to one end of the sleeve or the axle, as indicated in Fig. 3. Under this arrangement the arm is not moved laterally with the coupling, and therefore a short roller may be used on the side of the frame as a bearing for the lever.

I do not claim, broadly, a lifting-spring upon a beam or drag-bar, nor a spring which acts with decreased effect when the beam is in action, nor a spring which acts both to elevate and depress a beam, as I am aware that springs differing widely in construction and arrangement from my own have been applied to effect the ends named.

I am aware of the patent granted to James M. Elder, No. 222,391, and I lay no claim to the construction therein shown.

My invention is confined to an arrangement such as herein described and shown, subject to such modifications and changes as can be made without departing from the mode of action described.

Having described my invention, what I claim is—

1. In combination with the wheeled frame and the vertically-swinging beam or drag-bar jointed thereto, the upright arm connected rigidly with the beam, the lever jointed at its lower end to the arm and bearing at its upper end loosely against a fixed roll or bearing on the frame, and a spring-connection, substantially such as shown, uniting the arm and the lever with each other and tending to throw the beam upward.

2. In combination with the wheeled frame and the swinging beam jointed thereto, a rigid arm connected with the beam, a lever pivoted at one end to said arm and resting at its free end against a bearing on the frame, and a spring-connection, substantially such as shown, uniting the arm and the lever, and adjustable to and from their point of connection, substantially as described.

3. The combination of the frame, the beam having the arm connected rigidly therewith, the lever jointed to the arm and having the shoulder or incline near one end, the spring connecting the arm and lever, and the roller or bearing on the frame.

4. In combination with the lever G, as described and shown, the arm F, provided with the series of notches, the spring, and the adjustable spring-bearing.

5. In combination with a wheeled frame and a beam or drag-bar connected thereto, a lifting-spring, and an arm provided with an incline or shoulder, and adapted to be actuated by the spring, and to sustain the beam in an elevated position by means of said shoulder, substantially as described and shown.

CHARLES OTIS GARDINER.

Witnesses:
J. B. CHRISTIE,
CHAS. A. HARRIS.